United States Patent [19]

Arney et al.

[11] 4,009,329
[45] Feb. 22, 1977

[54] BIORESISTANT CELLULOSE ETHERS

[75] Inventors: William Charles Arney; Clarence Alfred Williams, both of St. Albans; Joseph Edward Glass, Jr., Charleston, all of W. Va.

[73] Assignee: Union Carbide Corporation, New York, N.Y.

[22] Filed: Nov. 14, 1975

[21] Appl. No.: 631,944

[52] U.S. Cl. .................. 536/84; 536/43; 536/44; 536/91; 536/96; 536/99

[51] Int. Cl.² .............. C08B 11/00; C08B 11/08

[58] Field of Search ........... 536/43, 44, 84, 91, 536/99, 96

[56] References Cited

UNITED STATES PATENTS

| | | | |
|---|---|---|---|
| 2,254,249 | 9/1941 | Swinehart et al. | 536/100 |
| 2,824,779 | 2/1958 | Reeves et al. | 536/44 |
| 2,831,852 | 4/1958 | Savage | 536/91 |
| 2,985,501 | 5/1961 | Gagarine | 536/84 |
| 3,032,549 | 5/1962 | Mitchell | 536/84 |
| 3,567,360 | 3/1971 | Pierce et al. | 536/44 |
| 3,709,876 | 1/1973 | Glomski et al. | 536/91 |
| 3,761,465 | 9/1973 | Callihan | 536/44 |
| 3,769,247 | 10/1973 | Glomski et al. | 536/91 |
| 3,873,518 | 3/1975 | Strange et al. | 536/91 |

OTHER PUBLICATIONS

Klug et al., Preprints Division of Organic Coatings and Plastics Industry, National Meeting, American Chemical Society, N.Y., N.Y., Aug. (1972), pp. 319–325 (Studies on the Distribution of Substituents in Hydroxyethylcellulose).

*Primary Examiner*—Ronald W. Griffin
*Attorney, Agent, or Firm*—Bernard Francis Crowe

[57] ABSTRACT

Cellulose ethers which are resistant to enzyme catalyzed hydrolysis can be prepared by using a mixture of sodium and lithium hydroxides as the catalysts in conjunction with etherification reagents, such as, epoxides or alkyl halides.

11 Claims, No Drawings

BIORESISTANT CELLULOSE ETHERS

BACKGROUND OF THE INVENTION

This invention pertains to the preparation of cellulose ethers having enhanced resistance to enzyme catalyzed hydrolysis and more particularly to the use of a mixture of lithium and sodium hydroxides as the catalyst for the etherification reaction.

Water-soluble cellulose ethers are widely used as thickening agents in a variety of aqueous based systems. However many of these cellulose ethers are subject to enzymatic hydrolysis. The resulting viscosity loss is usually detrimental to the end use properties, as for example, in cellulose ether thickened latex paints. It is known that the enzymatic sensitivity of a cellulose ether is related to, but is probably not an exclusive function of, the percent unsubstituted anhydroglucose units in this cellulose derivative. In turn the unsubstituted anhydroglucose units at a given degree of substitution is expected to be, at least in part, related to the relative reactivity ratios of the various hydroxyl groups in competition for an etherification agent. In agreement with these observations, enzyme resistant hydroxyethyl cellulose produced by the reaction of alkali cellulose with ethylene oxide has been very difficult to produce. The difficulty lies in the formation of the reactive primary alcohol of the hydroxyethyl substituent during the ethoxylation reaction. Chains of $-CH_2CH_2O-$ groups form which compete with the ethoxylation of the cellulose hydroxyl groups, thus leaving many unsubstituted anhydroglucose units.

This problem has prompted several attempts to prepare enzyme resistant cellulose ethers by utilizing, at least in part, an etherification reagent which reduces or eliminates the competitive chaining reaction. For example, U.S. Pat. No. 3,388,082 discloses the preparation of hydroxypropylmethyl cellulose having increased enzymatic resistance. Unfortunately, the latex paint industry has found that good color development and compatability is not possible with hydroxypropylmethyl cellulose and some pigments.

U.S. Pat. Nos. 3,709,876 and 3,769,247 describe a 2-step synthesis of cellulose ethers consisting of cellulose methylation followed by ethoxylation. These products are described as useful as paint thickeners but the 2-step nature of the reaction and formation of large amounts of inorganic halide in the methylation step make the synthesis unattractive from a commercial point of view.

SUMMARY OF THE INVENTION

A method of preparing cellulose ethers which are resistant to degradative enzyme hydrolysis has been found which involves using a mixture of sodium and lithium hydroxides as catalysts for the etherification of cellulose with etherification agents in a weight ratio of total hydroxide:cellulose of about 0.1 to about 0.8 and a weight ratio of lithium hydroxide:sodium hydroxide of about 0.1 to about 10.

By using the mixture of catalysts described above, the resultant cellulose ether has a far superior resistance to enzyme catalyzed hydrolysis than those cellulose ethers obtained using either sodium hydroxide or lithium hydroxide alone as the catalyst. A preferred weight ratio of total hydroxide:cellulose lies in the range of about 0.2 to about 0.5. A preferred weight ratio of lithium hydroxide:sodium hydroxide lies in the range of about 0.5 to about 1.5.

This discovery can be used with any process by which cellulose ethers are prepared by contacting cellulose with one or more etherification agents in the presence of water with or without organic diluents.

Any source of cellulose, a polymer of anhydroglucose monomer units, can be used including wood, cotton, and the like.

The term "cellulose ethers" is meant to include derivatives of cellulose in which all or a part of the hydrogen atoms on the hydroxyl group of the anhydroglucose monomer units have been replaced by alkyl groups or substituted alkyl groups, i.e., substituents linked to the cellulose backbone through $-C-O-C-$ ether bonds. The relative number of substituents is commonly designated as the degree of substitution (which is the moles of cellulose hydroxyl groups bearing a substituent per anhydroglucose unit) or molar substitution (which is defined as the moles of ether substituents per mole of anhydroglucose units). Substitution levels of etherification reagents which react with cellulose with the formation of a new cite of reaction, (e.g., epoxides) will be referred to as molar substitution (MS) and those that do not yield a reactive cite, (e.g. alkylhalides) will be referred to as degree of substitution (DS).

As will be recognized by those skilled in the art, phrases such as "resistant to enzyme degradation," "bioresistant", and the like are relative terms. A standard test must be employed in which examples are measured against each other under conditions of equivalent sample size, sample to enzyme ratio, temperature, pH and the like. Only then can these terms be applied and even then it is understood that they suggest a relative degree of resistance under those test conditions. Fortunately, such test comparisons usually can be extrapolated to the end-use conditions.

The most generally useful type of etherification reagents fall into two categories. The first are cyclic organic compounds forming ether linkages via ring opening reactions with the anhydroglucose hydroxyl groups and may be represented by the formula:

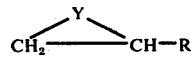

wherein R is hydrogen, an alkyl group either branched or linear having about 1 to about 10 carbon atoms, aryl or aralkyl groups containing 6 to about 12 carbon atoms which may or may not be further substituted by $-OR$, $NHR$, $-N(R)_2$, $-N(R)^+_3X^-$ (where X is halogen including fluorine, chlorine, bromine and iodine), $-SO_3R$ or similar hetero atoms and Y is $-O-$, $-NR-$, or $-S-$. The second category of etherification reagents are organic halides used in conjunction with an inorganic acid catalyst such as hydrochloric acid, hydrobromic acid and the like. These organic halides have the formula:

R—X wherein R and X are as defined above. Preferred organic halides include alkyl halides, such as, methyl chloride, ethyl bromide, propyl iodide, and the like.

The instant bioresistant cellulose ethers can be prepared in a simple, aqueous, stirrable slurry or an aqueous slurry which is further modified by the use of organic diluents. Useful organic diluents include aliphatic alcohols such as methanol, ethanol, isopropanol, butanol, and the like; aliphatic ketones such as methyl ethyl ketone, methyl isobutyl ketone, diethyl ketone, diisopropyl ketone, and the like, as well as mixtures of alcohols and ketones.

While not wishing to be bound by any theory or explanation, it is believed that the instant method provides the surprising higher resistance of the cellulose ethers so prepared by postulating that the cites of degradative enzyme attack are not the sole result of hydroxyl reactivity ratios in any given reaction. Rather it is believed that the known crystallinity of cellulose can produce relatively inexcessible areas within even swollen alkali cellulose. The inaccessability of such areas during reaction results in a disproportionate concentration of unsubstituted anhydroglucose units following the reaction with the etherification reagent. For some unexplained reason the combination of catalysts, sodium hydroxide and lithium hydroxide, renders these inaccessible areas accessible to the etherification reagents thus providing a more complete blocking of the hydroxyl groups of the anhydroglucose units.

The general preparation of cellulose ethers using the etherification reagents indicated above may be found in the Encyclopedia of Polymer Science and Technology, Volume 3, pages 459–539, Interscience Publishers, NYC (1965).

The levels of hydroxyl substitution on the anhydroglucose units of cellulose were determined by the method outlined by P. W. Morgan, Inc. and Eng. Chem., 18, 500 (1946) except for the hydroxypropyl substituents which were determined by the chromic acid oxidation method described in ASTM D-2363. The salt content of the cellulose samples after treatment with the sodium and lithium hydroxide catalysts was calculated as percent $Na_2SO_4$ following pyrolysis of the sample in the presence of excess sulfuric acid. Bioresistance was measured by inoculating 1 percent by weight aqueous polymer solutions with 10 ppm of a cellulose enzyme derived from *Aspergillus niger*, viz., Cellase 1000 Cellulase enzyme (provided by Wallerstein Company, Deerfield, Ill.). The decrease in solution viscosity of the solution at 30° C. was continuously recorded with a Brookfield Viscometer. Tests were conducted in the pH range of 5.7–7.0 either by simple adjustment (with acetic acid) or by using a potassium hydrogen phthalate-sodium hydroxide buffer solution (pH=5.75 ± 0.05). The bioresistance of a sample is then defined as the percent of the original viscosity retained after 75 minutes.

The invention is further described in the Examples which follow. All parts and percentages are by weight unless otherwise specified.

EXAMPLES 1–5

ONE STEP SYNTHESIS OF HYDROXYETHYL CELLULOSE

A resin flask equipped with a stirrer, thermometer, dry-ice condenser, nitrogen inlet tube and serum cap was charged with flock (Buckeye cellulose) and diluent. The system was purged free of air with nitrogen. A solution consisting of sodium hydroxide and lithium hydroxide in water was added through a hypodermic syringe through the serum cap and the cellulose was allowed to digest for 45 minutes. Then ethylene oxide was added with a hypodermic syringe through the serum cap and the reaction mixture was stirred and brought to a temperature of 75° C. with a hot water bath over a period of 1 to 2 hours. After stirring for 1 hour at 75° C. and then cooling one equivalent of acetic acid plus a 0.10 mole excess was added and the slurry was filtered directly. In some cases the addition of acetone as a diluent was useful to harden the polymer and facilitate filtration.

The product was washed several times with 25% water in acetone and dried at 70° C. overnight. The bioresistance (BR) of a 1 percent solution was then determined as described above. Pertinent data of the Examples are contained in Table I in which the amount of the various components was altered to demonstrate the breadth of the invention. The poor results of Controls A and B in which only lithium hydroxide or sodium hydroxide was used is also demonstrated in Table I.

TABLE I

| | EXAMPLES | | | | | Control A | Control B |
|---|---|---|---|---|---|---|---|
| | 1 | 2 | 3 | 4 | 5 | | |
| Cotton linters (gm) | 15.8 | 15.8 | 21.05 | 21.05 | 15.8 | 15.8 | 15.8 |
| Cont. cellulose (gm) | 15.0 | 15.0 | 20.0 | 20.0 | 15.0 | 15.0 | 15.0 |
| Organic diluent | (a) | (a) | (b) | (b) | (c) | (a) | (a) |
| Organic diluent (gm) | 225 | 225 | 300 | 300 | 300 | 225 | 225 |
| 10% LiOH, 1.102 gm/ml (ml) | 16.3 | 16.3 | 38.5 | 57.8 | 43.3 | 29.9 | — |
| 23% NaOH, 1.25 gm/ml (ml) | 12.9 | 7.7 | — | — | — | — | 28.5 |
| 50% NaOH, 1.52 gm/ml (ml) | — | — | 7.9 | 5.3 | 5.9 | — | — |
| Ethylene oxide (ml) | 37.4 | 37.4 | 47.6 | 45.3 | 34.0 | 44.2 | 44.2 |
| Acetic acid (ml) | 12.0 | 8.2 | 20.9 | 22.0 | 17.1 | 8.7 | 8.7 |
| Total $H_2O$/cellulose weight ratio | 3.28 | 3.45 | 4.10 | 4.96 | 3.18 | — | — |
| Product weight (gm) | 29.8 | 27.5 | 41.4 | 41.0 | 33.1 | 26.2 | 27.0 |
| % Volatiles | 3.97 | 1.95 | 0.80 | 1.80 | 1.30 | 3.92 | 3.90 |
| % Salt (as $Na_2SO_4$) | 2.39 | 0.63 | 4.08 | 5.69 | 7.79 | 0.47 | 2.00 |
| MS | 3.60 | 3.91 | 3.81 | 3.66 | 3.92 | 3.18 | 3.5 |
| Oxide efficiency (%) | 44.5 | 48.3 | 49.3 | 49.7 | 53.2 | — | 45 |
| 1% Solution (cps) | 2138 | 300 | 1775 | 1900 | 1425 | prod. | 1800 |
| BR (75 minutes) (d) | 22.5 | 50.0 | 39.4 | 36.8 | 43.9 | insol.* | 3.0 |

TABLE I-continued

| | EXAMPLES | | | | | Control A | Control B |
|---|---|---|---|---|---|---|---|
| | 1 | 2 | 3 | 4 | 5 | | |
| pH of BR test | 6.7 | 6.3 | 6.5 | 6.0 | 6.1 | — | 6.2 |

\* Product insoluble in water (prevented test of BR)
(a) $H_2O$/isopropanol azeotrope.
(b) 12.5% $H_2O$/acetone
(c) 70/30 (by weight) methyl ethyl ketone/isopropanol.
(d) the value shown for each run represents the percent of the original viscosity of the sample retained after 75 minutes under the bioresistant test conditions described at the beginning of this section.

EXAMPLES 6–11

ONE STAGE, 2-STEP SYNTHESIS OF HYDROXYETHYL CELLULOSE

The general procedure described in Examples 1–5 was repeated with the exception that the ethylene oxide was added in 2 steps instead of one with partial neutralization of the caustic catalyst after the first addition. The pertinent data for each Example is delineated in Table 2 together with the bioresistance values. These experiments demonstrate that an improved bioresistance is possible using the partial neutralization technique.

EXAMPLES 12–15

SYNTHESIS OF HYDROXYETHYLMETHYL CELLULOSE

Methyl cellulose was prepared by the conventional reaction of alkali cellulose with methyl chloride. Ethoxylations of these methyl celluloses were conducted by the general procedure described in Examples 1–5 to prepare the hydroxyethylmethyl cellulose products shown in Table 3. These experiments show that excellent bioresistance may be obtained with these mixed ether products. Moreover the level of methyl substitution (DS) need not be as high with the mixed catalyst system of this invention as is needed when sodium hydroxide is used as the sole catalyst. This comparison is shown by comparing Examples 12, 13, 14 and 15 with Controls C, D and E. In addition to the enhanced bioresistance an advance is demonstrated in the art in that the level of methyl substitution need not be as high with the use of mixed hydroxide catalyst as when one hydroxide is used alone. This means less sodium chloride in the product which is desirable because salt trapped in cellulose ether product is difficult and expensive to remove.

TABLE 2

| | EXAMPLES | | | | | |
|---|---|---|---|---|---|---|
| | 6 | 7 | 8 | 9 | 10 | 11 |
| Cotton linters (gm) | 21.50 | 21.05 | 21.05 | 21.05 | 21.05 | 21.05 |
| Cont. Cellulose | 20.00 | 20.00 | 20.00 | 20.00 | 20.00 | 20.00 |
| Organic diluent | (a) | (a) | (a) | (b) | (a) | (b) |
| Organic diluent (gm) | 300 | 285 | 295 | 300 | 290 | 267 |
| 11% LiOH, 1.11 gm/ml (ml) | 49.5 | 33.0 | 49.5 | 49.0 | 32.7 | 32.7 |
| 23% NaOH, 1.25 gm/ml (ml) | 20.6 | 13.7 | — | 20.6 | 20.6 | — |
| 50% NaOH, 1.52 gm/ml (ml) | — | — | 9.1 | — | — | 7.9 |
| Ethylene oxide, 1st step | 14.0 | 12.5 | 14.0 | 14.0 | 14.0 | 14.0 |
| Acetic acid (ml)\*\* | 17.1 | 9.5 | 20.0 | 17.1 | 12.7 | 12.7 |
| Ethylene oxide, 2nd step | 29.4 | 31.0 | 29.4 | 29.4 | 29.4 | 29.4 |
| Acetic acid (ml) | 9.1 | 8.0 | 4.0 | 9.3 | 6.3 | 6.3 |
| Total $H_2O$ (parts/part cellulose) | 3.45 | 3.05 | 3.02 | 3.51 | 3.11 | 3.57 |
| Product weight (gm) | 41.9 | — | 40.45 | 41.5 | 41.15 | 40.35 |
| % Volatiles | 2.30 | 3.87 | 2.62 | 3.49 | 1.75 | 1.62 |
| % Salt (as $NaC_2H_3O_2$) | 10.01 | 3.11 | 7.98 | 1.92 | 4.91 | 3.69 |
| MS | 3.20 | 3.53 | 2.76 | 3.66 | 3.51 | 3.51 |
| Oxide Efficiency, % | 45.2 | 49.9 | 39.0 | 51.7 | 49.7 | 49.7 |
| 1% Solution (cps) | 1300 | 1750 | 2925 | 1175 | 2000 | 1425 |
| BR (75 minutes) | 67.3\* | 76.4 | 42.0 | 68.1 | 53.8 | 57.9 |
| ph of BR test | 6.8 | 6.9 | 6.4 | 5.71 | — | 5.8 |

\*After additonal extractions to lower the percent salt to 1.37, the BR was 63.9 percent, thus the BR is not a result of salts inhibiting the enzyme.
\*\*Neutralization was conducted as described for final neutralization in Example 1.
(a) 70/30 (by weight) methyl ethyl ketone/isopropanol
(b) t-butanol

TABLE 3

| | EXAMPLES | | | | | | |
|---|---|---|---|---|---|---|---|
| | 12 | Control C | 13 | 14 | Control D | 15 | Control E |
| Methyl cellulose (gm) | 12.57 | 12.57 | 12.80 | 13.20 | 13.20 | 13.37 | 13.37 |
| Cont. cellu- | | | | | | | |

TABLE 3-continued

| | EXAMPLES | | | | | | |
|---|---|---|---|---|---|---|---|
| | 12 | Control C | 13 | 14 | Control D | 15 | Control E |
| lose (gm) | 12.0 | 12.0 | 12.0 | 12.0 | 12.0 | 12.0 | 12.0 |
| Organic diluent | ← | | | t—BuOH | | | → |
| Organic diluent (gm) | 162 | 159 | 151 | 162 | 158 | 162 | 158 |
| 11% LiOH, 1.11 gm/ml (ml) | 11.70 | 0 | 4.90 | 11.8 | 0 | 11.8 | 0 |
| 23% NaOH, 1.25 gm/ml (ml) | 6.20 | 15.30 | 2.10 | 6.2 | 14.4 | 6.2 | 14.4 |
| Ethylene oxide (ml) | 25.8 | 25.8 | 25.8 | 19.0 | 19.0 | 17.5 | 17.5 |
| Acetic Acid(ml) | 7.0 | 7.3 | 2.7 | 7.0 | 7.0 | 7.0 | 7.0 |
| Total H$_2$O (parts/part cellulose) | 2.97 | 2.97 | 2.99 | 2.97 | 2.93 | 2.93 | 2.93 |
| Product weight (gm) | 24.6 | 23.4 | 25.5 | 20.95 | 20.3 | 19.3 | 18.5 |
| % Volatiles | 1.68 | 1.54 | 1.47 | 2.08 | 2.08 | 2.34 | 15.9 |
| % Salt (as NaC$_2$H$_3$O$_2$) | 0.29 | 0.79 | 0.76 | 2.17 | 0.41 | 2.46 | 1.81 |
| DS of methyl cellulose charged | 0.33 | 0.33 | 0.33 | 0.47 | 0.47 | 0.77 | 0.77 |
| MS | 3.50 | 3.42 | 4.03 | 3.28 | 2.86 | 2.53 | 1.94 |
| Oxide efficiency (%) | 50.0 | 48.9 | 57.6 | 63.6 | 55.5 | 53.3 | 40.8 |
| 1% Solution (cps) | 1013 | 1300 | 1525 | 380 | 325 | 1050 | 1063 |
| BR (75 minutes) | 84.0 | 9.6 | 88.5 | 71.1 | 12.3 | 77.5 | 5.1 |
| pH of BR test | 5.70 | 5.70 | 5.70 | 5.70 | 5.70 | 5.70 | 5.70 |

EXAMPLES 16–19
SYNTHESIS OF HYDROXYETHYLHYDROXYPROPYL CELLULOSE

The reaction procedures described in Examples 1–5 and 6–11 were followed to obtain the products described in Table 4. These experiments illustrate that hydroxyethylhydroxypropyl cellulose can be obtained with excellent bioresistance by either a simple 1-step reaction as demonstrated by Examples 18 and 19 or by the partial catalyst neutralization technique of Examples 6–11 as demonstrated in Examples 16 and 17. Control F shows the lower bioresistance of the hydroxyethylhydroxypropyl cellulose prepared using only sodium hydroxide as the etherification catalyst.

EXAMPLE 20

Wood pulp (Rayflock-J Pulp from Rayonier Corp.) is treated with ethylene oxide in the presence of mixed lithium hydroxide/sodium hydroxide catalyst system as described in Examples 1–5. Bioresistance of the resulting product is improved relative to products of equivalent substitution levels prepared in the identical manner except that sodium hydroxide is used as the sole etherification catalyst.

EXAMPLE 21

The reaction described in Example 5 when repeated except for the omission of diluent shows excellent bioresistance in products produced by the action of the mixed catalyst systems.

EXAMPLE 22

The reaction described in Example 6 when repeated except that cotton linters are employed as the cellulose substrates shows excellent bioresistance in products produced by the action of the mixed catalyst system.

TABLE 4

| | EXAMPLES | | | | Control F |
|---|---|---|---|---|---|
| | 16 | 17 | 18 | 19 | |
| Cotton linters | 21.05 | 21.05 | 21.05 | 21.05 | 21.05 |
| Cont. cellulose (gm) | 20.00 | 20.00 | 20.00 | 20.00 | 20.00 |
| Organic diluent | t-BuOH | t-BuOH | t-BuOH | t-BuOH | t-BuOH |
| Organic diluent (gm) | 270 | 270 | 267 | 285 | 250 |
| 11% LiOH, 11.11 gm/ml (ml) | 32.7 | 32.9 | 32.7 | 49.0 | — |
| 23% NaOH, 1.25 gm/ml (ml) | — | — | 20.7 | 20.6 | 25.4 |
| 50% NaOH, 1.52 gm/ml (ml) | 7.9 | 7.9 | — | — | — |
| Ethylene oxide (ml) 1st step | 11.0 | 11.0 | 43.5 | 43.5 | 43.5 |
| 2nd step | 20.6 | 20.6 | | | |
| Propylene oxide (ml) 1st step | 21.2 | 10.6 | 21.2 | 21.2 | 21.2 |
| 2nd step | — | 10.6 | | | |

TABLE 4-continued

| | EXAMPLES | | | | Control |
|---|---|---|---|---|---|
| | 16 | 17 | 18 | 19 | F |
| Acetic Acid (ml) | | | | | |
| 1st step | 12.7 | 12.7 | 21.0 | 26.4 | 12.2 |
| 2nd step | 6.0 | 6.0 | | | |
| Total H$_2$O (parts/ part cellulose) | 3.42 | 3.44 | 4.26 | 2.10 | 3.72 |
| Product weight (gm) | 39.2 | 40.45 | 41.55 | 40.15 | 42.2 |
| % Volatiles | 1.59 | 3.24 | 1.25 | 2.77 | 2.34 |
| % Salt | (as NaC$_2$H$_3$O$_2$ | 4.04 | 3.63 | 3.17 | 2.09 | 4.07 |
| PO MS | 0.54 | 0.38 | 0.39 | 0.35 | 0.38 |
| EO MS | 2.34 | 2.41 | 2.93 | 3.23 | 3.07 |
| EO efficiency (%) | 45.4 | 46.8 | 41.5 | 45.7 | 43.4 |
| PO efficiency (%) | 21.9 | 15.3 | 15.7 | 14.2 | 15.5 |
| 1% Solution (cps) | 688 | 1613 | 963 | 1388 | 950 |
| BR (75 minutes) | 70.0 | 65.9 | 66.5 | 66.0 | 38.8 |
| pH of BR test | 5.73 | 5.72 | 5.77 | 5.71 | 5.72 |

Although the invention has been described in its preferred form with a certain degree of particularity, it is understood that the present disclosure of the preferred form has been made only by way of example and that numerous changes may be resorted to without departing from the spirit and the scope of the invention.

What is claimed is:

1. In the method of preparing cellulose ethers by contacting the unsubstituted anhydroglucose units of cellulose with one or more etherification agents in the presence of a catalyst, the improvement which comprises using a mixture of sodium and lithium hydroxides as the catalyst with a weight ratio of total hydroxide:cellulose of about 0.1 to about 0.8 and a weight ratio of lithium hydroxide:sodium hydroxide of about 0.1 to about 10, whereby a cellulose ether which is resistant to enzyme catalyzed hydrolysis is obtained.

2. Method claimed in claim 1 wherein the weight ratio of total hydroxide:cellulose is about 0.2 to about 0.5.

3. Method claimed in claim 1 wherein the weight ratio of lithium hydroxide:sodium hydroxide is about 0.5 to about 1.5.

4. Method claimed in claim 1 wherein the etherification of cellulose is carried out in an aqueous slurry with the weight ratio of water:cellulose being about 0.5 to about 10.

5. Method claimed in claim 4 wherein the aqueous slurry is diluted with an organic diluent in a weight ratio of diluent:cellulose of about 5 to about 20.

6. Method claimed in claim 1 wherein the etherification reagent is a cyclic organic compound having the formula:

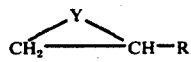

wherein R is a monovalent radical selected from the group consisting of hydrogen, alkyl having 1 to 10 carbon atoms and aryl or aralkyl having 6 to 12 carbon atoms, and Y is a divalent radical selected from the group consisting of —O—, —S—, or —NR—.

7. Method claimed in claim 6 wherein the cyclic organic compound is ethylene oxide.

8. Method claimed in claim 6 wherein the cyclic organic compound is propylene oxide.

9. Method claimed in claim 1 wherein the etherification reagent is a halide having the formula:

R' — X wherein R' is a monovalent radical selected from the class consisting of alkyl having 1 to 10 carbon atoms and aryl or aralkyl having 6 to 12 carbon atoms.

10. Method claimed in claim 9 wherein the halide is an alkyl halide.

11. Method claimed in claim 10 wherein the alkyl halide is methyl chloride.

* * * * *